US007504438B1

(12) United States Patent
Treybig et al.

(10) Patent No.: US 7,504,438 B1
(45) Date of Patent: Mar. 17, 2009

(54) DEMULSIFIERS, THEIR PREPARATION AND USE IN OIL BEARING FORMATIONS

(75) Inventors: Duane S. Treybig, Sugarland, TX (US); Kin-Tai Chang, Sugar Land, TX (US); Dennis A. Williams, Houston, TX (US)

(73) Assignee: Nalco Company, Naperville, IL (US)

( * ) Notice: Subject to any disclaimer, the term of this patent is extended or adjusted under 35 U.S.C. 154(b) by 374 days.

(21) Appl. No.: 10/034,661

(22) Filed: Dec. 20, 2001

(51) Int. Cl.
 *B01D 17/05* (2006.01)
 *C08G 59/10* (2006.01)
 *C09K 8/60* (2006.01)
 *B01D 17/00* (2006.01)

(52) U.S. Cl. ............ 516/161; 528/405; 528/418; 528/121; 528/423; 507/219; 516/163; 525/526

(58) Field of Classification Search ........ 516/161, 516/163; 528/121, 523, 423, 405, 418; 507/219; 525/526
See application file for complete search history.

(56) References Cited

U.S. PATENT DOCUMENTS

| | | | |
|---|---|---|---|
| 2,136,928 A | 11/1938 | Schlack | |
| 2,599,974 A | 6/1952 | Carpenter et al. | |
| 2,642,412 A | 6/1953 | Newey et al. | |
| 2,723,241 A | 11/1955 | Goote et al. | |
| 2,864,775 A | 12/1958 | Newey | |
| 3,317,471 A | 5/1967 | Johnson et al. | |
| 3,349,053 A | 10/1967 | Ashby | |
| 3,350,325 A | 10/1967 | Ashby et al. | |
| 3,738,945 A | 6/1973 | Panzer et al. | |
| 3,900,423 A | 8/1975 | Markofsky | |
| 4,032,514 A | 6/1977 | Buriks et al. | |
| 4,162,244 A | 7/1979 | Bertram | |
| 4,260,019 A | 4/1981 | Blair, Jr. | |
| 4,382,852 A | 5/1983 | McCoy et al. | |
| 4,396,499 A * | 8/1983 | McCoy et al. ............ | 208/188 |
| 4,404,096 A | 9/1983 | McCoy et al. | |
| 4,460,627 A | 7/1984 | Weaver et al. | |
| 4,465,817 A | 8/1984 | Billenstein et al. | |
| 4,532,052 A | 7/1985 | Weaver et al. | |
| 4,617,132 A | 10/1986 | Dalrymple et al. | |
| 5,272,226 A | 12/1993 | Lancaster et al. | |
| 5,275,853 A | 1/1994 | Silvis et al. | |
| 5,324,404 A * | 6/1994 | Ott et al. ............ | 204/501 |
| 5,464,924 A | 11/1995 | Silvis et al. | |
| 5,565,506 A * | 10/1996 | Papalos et al. ............ | 523/404 |
| 5,567,782 A * | 10/1996 | Marten et al. ............ | 525/523 |
| 5,585,446 A * | 12/1996 | Marten et al. ............ | 525/523 |
| 5,591,812 A * | 1/1997 | Starner ............ | 525/526 |
| 5,648,409 A * | 7/1997 | Arora et al. ............ | 523/404 |
| 5,681,907 A * | 10/1997 | Starner et al. ............ | 525/526 |
| 5,834,078 A | 11/1998 | Cavitt et al. | |
| 6,569,983 B1 | 5/2003 | Treybig et al. ............ | 528/102 |

* cited by examiner

*Primary Examiner*—Daniel S Metzmaier
(74) *Attorney, Agent, or Firm*—Michael B. Martin

(57) ABSTRACT

The invention comprises a polymeric demulsifier, methods of producing the demulsifier and methods of using the demulsifier. The demulsifier is the reaction product of at least one amine-containing group, and optionally a second amine-containing group which includes a tertiary amine group, with a diepoxy- or diglycidyl compound and an additional amine compound subsequently reacted with unreacted epoxy groups. This polymeric composition is subsequently reacted with N-alkylating agent containing compounds to produce novel demulsifiers useful to demulsify oil bearing formations.

18 Claims, No Drawings

DEMULSIFIERS, THEIR PREPARATION AND USE IN OIL BEARING FORMATIONS

FIELD OF THE INVENTION

This invention relates to new demulsification compounds and formulations. In particular, this invention relates to the demulsification of oil-bearing formations that have been treated with novel N-alkylated polyhydroxyetheramines.

BACKGROUND OF THE INVENTION

Acid or other chemical based extraction of oil-bearing deposits can lead to emulsion formation within the extracted phase from the deposit. These emulsions can make it extremely difficult to remove the oil content from the deposit. "Demulsifiers" are used as one chemical means of destroying or "breaking" such unwanted emulsions. This process is defined in Hawley's 11$^{th}$ Chemical Dictionary, Van Nostrand Reinold Company Inc., N. Irving Sax, ed., (p. 352), 1987, as "Demulsification". Chemical means of breaking an emulsion include the addition of polyvalent ion sources or a material such as nonylphenol, to the emulsion. However, while such materials provide some measure of utility in demulsification, there is still an ongoing need for more effective and useful demulsifiers.

SUMMARY OF INVENTION

The present invention is directed to novel oligo- and polymeric compounds, compositions and their methods of preparation and use. These materials, primarily aliphatic polyhydroxyetheramines and quarternized aliphatic polyhydroxyetheramines, are broadly useful in demulsifing (emulsified) hydrocarbons and more specifically, demulsifing oil-bearing formations that have been extracted/digested with, for example, organic or inorganic acids. It has been discovered that these new oligo- or polymeric demulsifiers can be obtained by reacting amines or amine containing groups having two reactive amino hydrogens with aliphatic diglycidyl ethers of diols, and/or epoxidized olefins. Additional demulsifiers according to the invention can be obtained using a second amine-containing group wherein the second amine-containing group incorporates a tertiary amine group. Additional demulsifiers according to the invention can be obtained by "capping" some or all of the remaining epoxy groups on the basic polyhydroxyetheramine with various additional amine-containing groups. Finally, it has been discovered that the amino- or amine groups of the oligomeric and polymeric demulsifiers can be alkylated or quaternized with an N-alkylating agent containing-group such as epihalohydrin-containing groups to provide novel demulsifiers. With a view these discoveries, there are provided:

A first embodiment of a new polymeric demulsifier obtained by reacting an amine or amine-containing group having two reactive amino hydrogens with an aliphatic diglycidyl ether of a diol, or an epoxidized olefin, or mixtures thereof.

A second embodiment obtained by reacting a first amine or amine-comtaining group having two reactive amino hydrogens and a second amine or amine-containing group having two reactive amino hydrogens and a tertiary amine group with an aliphatic diglycidyl ether of a diol, or an epoxidized olefin or mixtures thereof.

A third embodiment obtained by reacting an amine or amine-containing group having two reactive amino hydrogens with an aliphatic diglycidyl ether of a diol or an epoxidized olefin, or mixtures thereof and subsequently "capping" (i.e. reacting some or all of) the unreacted epoxy groups with an amine or amine-containing group having one or two reactive amino hydrogens.

A forth embodiment is obtained by reacting a mixture of an amine or amine-containing group having two reactive amino hydrogens, and an amine or polyamine having two reactive amino hydrogens and a tertiary amine group, with an aliphatic diglycidyl ether of a diol or an epoxidized olefin or a mixture of these and subsequently "capping" some or all of the remaining epoxy groups on the resulting compound with an amine or amine-containing group having one or two reactive amine hydrogens. The capping amine can further comprise tertiary amine groups.

A fifth embodiment is obtained by grafting an N-alkylating agent-containing group, such as epihalohydrin-capped polyalkylene glycol methyl ether, onto any of embodiments 1, 2, 3 or 4 to thereby produce novel compounds useful in demulsifing an emulsified hydrocarbon such as an oil-bearing formation.

A sixth embodiment of the present invention is obtained by formulating any one of the previously disclosed demulsifier compounds with suitable solvents, such as alcohols, various alkyl or substituted alkoxy copolymers; phenol-formaldehyde resins (e.g. resoles and novalacs, or other resins or similar compounds known in the art). The formulation can further comprise organic or inorganic acids, or mixtures of acids, to obtain a demulsifier formulation which is easily and conveniently used to treat an emulsified oil bearing formation to break or preclude emulsion formation.

A seventh embodiment of the present invention provides processes for the treatment of oil bearing formations to break emulsions resulting from acid or other ionic or nonionic stimulation of an oil or hydrocarbon formation.

An, eighth embodiment of the present invention provides methods and processes for the production of the novel demulsifier compounds and compositions.

These and other embodiments are described in detail to allow one skilled in the art to make and use them in the following section.

DETAILED DESCRIPTION OF THE INVENTION

The Amines and Amine-Containing Group Compound

Suitable amines and amine-containing group compounds or monomers useful in the various embodiments of the invention are those amines having only two reactive amino hydrogens and may be represented by but are not limited to the following formulas:

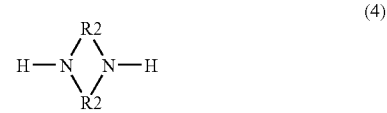

and

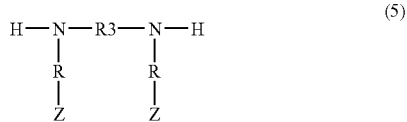

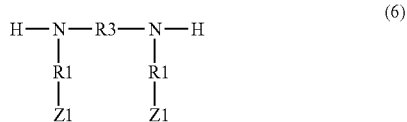

R is a $C_2$-$C_{10}$ alkyl group; either a saturated, unsaturated, or substituted alkyl, with ethylene and propylene being the most preferred groups. Also useful in the present invention are hydroxy or hydroxy-alkyl substituted $C_2$-$C_{10}$ saturated or unsaturated hydrocarbons;

R1 can be an alkoxy radical which can be represented by the formula:

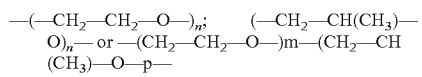

where n, m and p are 1 to about 120;

R2 is a $C_2$-$C_{10}$ alkylene radical or substituted $C_2$-$C_{10}$ alkylene radical wherein the carbons can be further substituted with various groups, including alkylamindo, hydroxy, alkoxy, halogen, cyano, dialkylamino, aryloxy-, alkylcarbonyl (e.g. ketonic group) or arylcarbonyl groups. Ethylene is the most preferred R2 substitutent;

R3 is a $C_2$-$C_{20}$ alkylene (alkyl radical or hydrocarbyl group; saturated or unsaturated), or R3 in certain preferred embodiments is phenyl, ethylene and hexane. R3 can also be a substituted $C_2$-$C_{20}$ alkylene wherein the carbon atoms can be further substituted with various groups including: alkylamido, hydroxy, alkoxy, halo, cyano, aryloxy, alkylcarbonyl, arylcarbonyl, alkylamido, and dialkylamine. Hydroxy- and alkoxy- groups are the more preferred substituents on the R3 radical.

Z can be hydrogen, alkylamido, hydroxy, dialkylamine, alkoxy, halogen, aryloxy, cyano, alkylcarbonyl, or arylcarbonyl, or a nitrogen containing moiety such as piperidine, morpholine, pyrrolidine, pyridine or other heterocyclic- aliphatic or heterocyclic-aromatic compound. Preferred Z substituents include alkylamido, hydroxy, dialkylamino and alkoxy groups. A preferred dialkylamine is dimethylamine and a preferred Z1 is hydrogen, an alkyl or an acyl group with hydrogen and methyl most preferred.

Suitable amines represented by formula (1) include, but are not limited to methylamine, ethylamine, propylamine, butylamine, sec-butylamine, isobutylamine, 3,3-dimethylbutylamine, hexylamine, benzylamine, 2-amino-1-butanol, 4-amino-1-butanol, 2-amino-2-methyl-1-propanol, 6-amino-1-hexanol, ethanolamine, propanolamine, tris(hydroxymethyl)aminomethane, 1-amino-1-deoxy-D-sorbitol (D-glucamine), 3-amino-1,2-propanediol, 2-amino-2-methyl-1,3-propanediol, 2-amino-2-ethyl-1,3-propanediol, 3-(dimethylamino)propylamine, N,N-dimethylethylenediamine, N,N-diethylethylenediamine, 1-(2-aminoethyl)piperidine, 4-(2-aminoethyl)morpholine, 2-(2-aminoethyl)-1-methylpyrrolidine, 1-(2-aminoethyl)pyrrolidine, and 2-(2-aminoethyl)pyridine.

Suitable amines represented by formula (2) include but are not limited to polyoxyalkylenamines, such as the Jeffamine M-series™ available from Huntsman Chemical Corporation, USA. The Jeffamine M-series of compounds are made by the reaction of a monohydric alcohol initiator with ethylene and/or propylene oxide(s), followed by conversion of the resulting terminal hydroxyl group to an amine group. The preferred M-series™ amines have the general structure in formula (7):

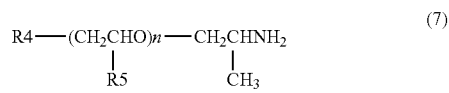

where R4 is an alcohol initiator and is usually $CH_3O$—, R5 is either hydrogen or —$CH_3$ and n is in the range of 1 to about 45.

Suitable amines represented by formula (3) include but are not limited to ethoxylated and propoxylated ethyleneamines such as 2-(2-aminoethylamino)ethanol. In formula (3), n may vary from 0 to 20.

Suitable amines represented by formula (4) include, but are not limited to piperazine, 2-methyl piperazine, 2,6-dimethylpiperazine and 2-(methylamido)piperazine.

Suitable amines represented by formula (5) include, but are not limited to N,N'-bis(2-hydroxyethyl)ethylenediamine, N,N'-dimethylethylenediamine, N,N'-dimethyl-1,4-phenylenediamine and N,N'dimethyl-1,6-hexanediamine.

It has been surprisingly discovered that the presence of tertiary amine group substituents on the backbone polymer can enhance the grafting of an N-alkylating agent group-containing compound to form the novel demulsifiers of the present invention. Such tertiary amine groups are preferred in demulsifiers of the invention. Examples of amines having two reactive amino groups and substituted with a tertiary amine group are 3-(dimethylamino)propylamine; N,N-dimethylethylenediamine; N,N-diethylethylenediamine; 1-(2-aminoethyl)piperidine; 4-(2-aminoethyl)morpholine; 2-(2-aminoethyl)-1-methylpyrrolidine; 1-(2-aminoethyl)pyrrolidine; and 2-(2-aminoethyl)pyridine. Extended tertiary amines for reaction with an N-alkylating agent can also be provided by ditertiary amine end groups.

The quantity of an amine having two reactive amino hydrogens and a tertiary amine group can comprise 0 to 50 mole % of the total amines having two reactive amino hydrogens reacted with the diepoxide or diglycidyl-containing group compound, depending on which amine having two reactive amino hydrogens and a tertiary amine group is reacted. For example, 3-(dimethylamino) propylamine comprises 0 to about 10%, preferably 0 to 6% and most preferably 0 to 2 mole % of the total amines having two reactive amino hydrogens in a preferred embodiment. Other suitable amines will be known to those of ordinary skill in the art.

The Epoxide and Glycidyl Compounds

The amine can be reacted with an aliphatic or cycloaliphatic compound having two reactive epoxide groups, e.g. a diepoxy-compound such as a diglycidyl ether of a diol, or an epoxidized olefin to produce embodiments of the present invention. The diglycidyl ether of a diol is represented by the following structure in formula (8):

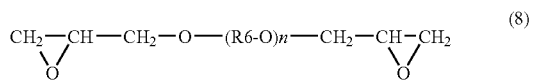

where R6 is a $C_2$ to $C_{20}$ alkyl radical, alkyl substituted $C_2$ to $C_{20}$ alkyl radical, $C_2$ to $C_{40}$ alkoxy, or a $C_2$ to $C_{40}$ hydroxy-substituted alkoxy- group radical; n can vary from 0 to about 20, and is preferably in the range of 0 to about 10.

Suitable diglycidyl ethers of diols according to formula (8) include, but are not limited to: bis(2,3-epoxypropyl)ether, diglycidyl ether of 1,4-butanediol, diglycidyl ether of neopentyl glycols, diglycidyl ether of ethylene glycols, glycerol diglycidyl ethers, diglycidyl ether of polyethyleneglycols, diglycidyl ethers of polypropylene glycols, diglycidyl ethers of glycols from the reaction product of ethylene oxide and propylene oxide thereby producing poly(ethoxy-propyloxy) polymer, including block copolymers. Other useful diglycidyl ethers of diols not represented by the above formula include diglycidyl ethers of cyclohexane dimethanol and diglycidyl esters of organic dimer acids, for example, 1,4-cyclohexandimethanol diglycidyl ether.

The epoxidized olefins can be represented by the structure in formula (9):

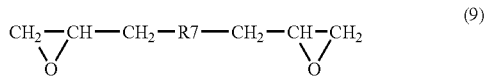

Where R7 is a $C_2$ to $C_{20}$ alkyl radical or an alkyl substituted $C_2$ to $C_{20}$ alkylene group moiety. Suitable epoxidized olefins include 1,2,3,4-diepoxybutane; 1,2,7,8-diepoxyoctane and 1,2,9,10-diepoxydecane. Cyclodiepoxidized olefins including 1,2,5,6-diepoxycyclooctane are also useful in certain embodiments of the invention. The most preferred epoxidized olefin is 1,2,7,8-diepoxyoctane.

Triepoxides, especially aliphatic triepoxides, can be mixed with diepoxides to provide branching and crosslinking points to provide additional embodiments of the inventive demulsifier. Suitable aliphatic triepoxides include, but are not limited to trimethyol propane triglycidyl ether, the polyglycidyl ethers of castor oil, polyglycidyl ethers of aliphatic polyols, and aromatic triepoxy derived compounds such as 1, 3, 5 triglycidyl benzene and the like. The triepoxy- compound can be mixed in amounts effective to provide branching points while not affecting or limiting solubility. The amounts of the triepoxides can be as much as 25 wt. %., preferably less than five wt. % and most preferably less than one weight percent. Additionally, tetra-functional glycidyl or epoxide-containing compounds can be used as branch points. Such compounds may be derived from various polyols known in the art.

The Polymerization Reaction

In preparing embodiments of the present invention, the reactants can be mixed at a mole ratio of the amines, having two reactive amino hydrogens, to the diepoxide or diglycidyl-containing compounds of from about 0.8:1 to about 1.3:1. Preferably a molar ratio of from about 0.9:1 to 1.1:1 is useful and most preferably a molar ratio of from about 1:1 to about 1.05:1 is useful.

The reaction of the present invention is very exothermic: a solvent and external cooling to control the exothermic nature of the reaction when prepared in a batch reactor can be used. Suitable solvents are, preferably water, or alcohol soluble solvents such as di(propylene glycol) methyl ether, 2-methoxyethyl ether and the like as would be known to a skilled artisan.

Preferably, the initial reaction is conducted under a blanket of nitrogen or another inert gas. Preferably the initial reaction is conducted at a temperature of from about 25° C. to about 240° C., more preferably at a temperature of about 25° C. to 150° C. and most preferably at a temperature of 25° to 100° C. After the initial reaction exotherm, subsequent reaction(s) is (are) carried out between about 140° and 200° C., preferably between 140° and 180° C. and most preferably between about 140° and 160° C. The reaction can be carried out over a time of from 10 minutes to 100 hours or more, depending on the reactants used and viscosity (i.e. degree of polymerization) desired. The reaction can be conducted neat, in a batch reactor, or in an extruder depending on the desired product. There is no limit on the maximum viscosity, except the final material cannot from a gel and it must be soluble in water, methanol or other ether or alcohol solvent. Typically, the viscosity of these materials, depending on the percent solids (which can range from about 10% to 100%), is in the range of 500 cps to about 2,000,000 cps.

The Capping Reaction

The presence of secondary amine or tertiary amine end groups is preferred as opposed to epoxide groups to improve the product solubility in water and alcohol solvents, and prevent continuing reactions which could result in a gelled or too high a molecular weight product (i.e. too high a viscosity). Amine end groups are synthesized by "capping" the linear, or branched polymer's terminal epoxide groups. Thus, for the purposes of the present disclosure a "capped" polymer is one in which unreacted epoxy groups have been reacted with amine containing groups. Secondary amine end groups are obtained from subsequent "capping" reactions of the remaining un-reacted epoxide groups with at least one of the amines having two available amino hydrogens. These "capping" reactions are performed at a concentration of about 1 to ten molar percent excess amine, more preferably, 2 to 5 mole percent excess amine. Tertiary amine "capped" end groups can be obtained by reacting un-reacted epoxide groups with amines having at least one available amino hydrogen, such as diethanolamine, diisopropanolamine, N-methyl-D-glucamine, N-methylpropylamine, dimethylamine, diethylamine, dipropylamine, diisopropylamine and the like. Ditertiary amine end groups can be obtained by reacting the epoxide with amines having one available amino hydrogen substituted with a tertiary amine group such as N,N,N'-trimethyl-1,3-propanediamine, N,N,N'-trimethylethylenediamine, N,N-dimethyl-N'-ethylethylenediamine, N,N,N'-triethylethylenediamine and like compounds. Ditertiary amine end groups also provide extended tertiary amine groups for grafting the N-alkylating agents such as epichlorohydrin terminated polyethyleneglycol (e.g. MPEG)-containing group compounds onto the polymer backbone.

The backbone polymer can vary in percent solids from about 20 to 100 wt. %, preferably from 50 to 80 wt. % and most preferably from 60 to 70 wt. %, in a suitable solvent such as an alcohol, ether or water as needed. The viscosity of these polymers is deemed an adequate measure of their molecular weights, or degree of reaction, for the purposes of the invention and can range from about 500 cps to 2,000,000 cps or more, depending on the desired properties of the demulsifier. The resulting polyhydroxyetheramine polymers can be further protonated by reacting with a proton source to provide a protonated polyhydroxyetheramine. Common organic or inorganic acids, such as hydrochloric or sulfuric acid, are used to prepare protonated polymers.

N-Alkylating Agents

Branches are attached to the polymer backbone by grafting N-alkylating agents such as epihalohydrin-reacted polyalkoxides according to formula (10) or (11):

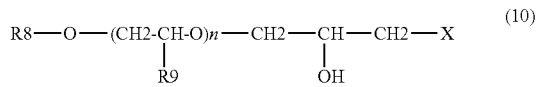

or

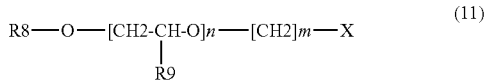

where R8 is a functional group provided by reaction to terminate the polyalkoxide, R9 is hydrogen or $C_1$ to $C_6$ alkyl group, n is from 1 to 120, preferably 100 to 113, m is from 2 to 24, X is a halogen atom with chloride and bromide being the most preferred. R8 can be a methyl, hydrogen, $C_1$-$C_6$ alkyl, $C_6$-$C_{10}$ aryl, oxy(2-hydroxy-3-chloropropyl), or oxy(2,3-oxopropyl). Other examples of alkylating agents are R-X type compounds where R is $C_5$ to $C_{24}$ alkyl or benzyl groups and X are halogen, sulfate or sulfonate groups such as tosylate, methane sulfonate, and trifluromethane sulfonate. Other examples include alcohol sulfonates and alpha olefin sulfonates such as $C_{16}$-$C_{18}$ olefin sulfonate, $C_{14}$-$C_{16}$ olefin sulfonate and $C_{12}$-$C_{14}$ olefin sulfonate and the like. Examples of alcohol sulfates include sodium lauryl sulfate; sodium octyl sulfate; sodium decyl sulfate. Examples of R-X compounds where X is a halide include 1-chlorohexane, 1-bromooctane, 1-chlorooctane, 1-chlorohexadecane, 1-chlorooctadecane, 1-bromooctadecane, and 1-bromohexadecane.

The preferred N-alkylating agent containing compound is epichlorohydrin capped polyalkylene glycol methyl ether. When R9 is hydrogen, the polyalkoxide is polyethyene oxide; when R9 is $C_1$ alkyl group the polyalkoxide is polypropylene oxide; when R9 is $C_2$ alkyl group, polyethylene oxide is polybutylene oxide and thelike. The N-alkylating agent can be added to the polymeric composition in amounts as needed to provide the balance of properties required for the demulsifier.

N-alkylating agents such as epihalohydrin reacted polyalkoxides are grafted onto tertiary amine groups on the polyhydroxyetheramine polymer between 40° to 100° C., preferably 60 to 95° C. and most preferably at between 85° and 90° C. The higher the grafting reaction temperature, the faster the grafting rate, as will be known to one of skill in the art. The pH also influences the rate of the grafting reaction. The reaction can be carried out at a pH between 7.5 and 12.0, preferably between 8.0 and 9.0 and most preferably between 8.3 and 8.8. The N-alkylating agent is grafted onto the polymer using a weight ratio of between 1:1 to 8:1 of polymer to N-alkylating agent. The resulting grafted demulsifier varies in percent solids from 20 wt. % to 60 wt. %, preferably 25 wt. % to 50 wt. % and most preferably 35 wt. % to 50 wt. % in a solvent such as water, ether, or alcoholic solvents. The polyhydroxyetheramine polymer can be directly reacted with the N-alkylating agent or the polyhydroxyetheramine can be reacted with an acid, such as hydrochloric acid or sulfuric acid and subsequently reacted with the N-alkylating agent.

One method of following the rate of the grafting reaction is to monitor the viscosity. A Brookfield viscometer is typically used. When the viscosity of the graft polymer reaches between 200 and 9000 centipoise (cps) preferably 200 to 5000 cps, and most preferably 400 to 5000 cps, the grafting reaction is deemed sufficient and typically stopped. If the viscosity increases too rapidly, adding a mixture of acid and/or salt water so that an acidic pH results, stops the reaction. Preferably the pH is between about 2.0 to 7.0 and most preferably about 3.5 to 5.0. Sulfuric acid or hydrochloric acid and the preferred acids, although other acids will work.

The Demulsifier Formulation

The demulsifier can be formulated by dissolving about 10 to 70 wt. %, preferably about 50 to 60 wt. %, most preferably about 50 wt. % of the polyhydroxyetheramine backbone polymer or grafter backbone polymer (on a 100 wt. % solids basis) in $C_1$ to $C_{16}$, preferably $C_1$ to $C_{10}$ and more preferably $C_1$ to $C_8$ alcohols, or ethers or water or other suitable solvents or mixtures of such solvents as required. Wetting improvement agents are also useful in preparing formulations. These materials include oxyalkylated alcohols, phosphate esters, surface tension modifiers, acid and crude interface modifiers such as arylalkylsulfonic acids or polyglycols. Other useful additives include breaking speed improving and stabilizing agents such as polyglycols or alkylene oxide block copolymer blends. These include ethoxylated alcohols, alkylphenol/formaldehyde resins, oxyalkylated alkylphenol/formaldehyde resins, their blends and their blends with any of the other aforementioned agents or additives as will be known to one of skill in the art. These materials can be added to the formulation, as needed, depending on the nature of the oil or hydrocarbon deposit emulsion being broken.

Treating an oil bearing formation with the demulsifier compositions of the present invention generally requires 0.05 to 3 gallons (0.05 to 3 wt. %) of the formulated de-emulsifier per 1000 gallons of an aqueous inorganic and organic acids as a basic ratio, although more or less can be used as required. These can be premixed. Aqueous acids used to stimulate a well/hydrocarbon formation include hydrochloric acid, hydrofluoric, sulfamic, acetic acid, formic acid, nitric acid, citric acid, ethylenediaminetetraacetic acid, nitriloacetic acid, mixtures thereof and the like.

Demulsifier formulations for water-in-oil emulsions are usually formulated by dissolving up to about 30 wt. % of the backbone polymer or grafter backbone polymer (on a 100 wt. % solids basis) in hydrocarbons like xylene, heavy aromatic naphtha, $C_1$ to $C_{16}$ alcohols, and the like. Other materials which are useful include, but are not limited to: wetting improvement agents like oxyalkylated alcohols or phosphate esters; surface tension modifiers; breaking speed improving agents such as polyglycols or alkylene oxide block copolymer blends; stabilizing agents such as polyglycols. Other emulsion breakers such as polyglycols, ethoxylated alcohols, alkylphenol/formaldehyde resins, oxyalkylated alkyl phenol/formaldehyde resins, their blends and their blends with any of the aforementioned agents or additives can be added.

EXAMPLES

The following Examples are provided to be illustrative of the present invention and to teach one of ordinary skill in the art how to make and use the present invention. These Examples are not intended to limit the invention in any way and serve to only illustrate certain embodiments.

Example 1

Diglycidyl ether of butanediol (202.24 grams, 0.9999 mole, 202.25 g/mole), ethanolamine (61.23 grams, 1.002 mole) and di(propylene glycol) methyl ether (161.60 grams) were weighed into a 1-liter resin kettle equipped with a thermocouple and heating device, condenser, stirrer and stirrer assembly and nitrogen purge assembly. The reactor contents were a clear water white liquid. The contents were heated to 90° C. where the reactants exothermed to 137° C. The reactor contents were heated between 140° to 161° C. for a period of 1 hour and 44 minutes and then cooled to room temperature. The reactor contents were an orange colored transparent liquid with a Brookfield viscosity of 4627 cps. The polymer was soluble in water and methanol. The infrared spectra showed a broad band at 3400 cm01 (OH stretch), a medium band at 1641 cm-1 (OH deformation), a medium bend at 1452 cm-1 (aliphatic bending) and a band at 1109 cm-1 (COC and COH stretch).

Example 2

Diglycidyl ether of neopentyl glycol (216.39 grams, 1.0005 moles) and di(propylene glycol)methyl ether (170.0 grams) were weighed into a 1-liter resin kettle equipped with a thermocouple and heating device, condenser, stirrer and stirrer assembly and nitrogen purge assembly. The contents were heated to 82° C. the nitrogen purge assembly was replaced with an addition funnel. Ethanolamine (61.15 grams, 1.001 moles) was added dropwise from the addition funnel to the reactor contents over a period of 33 minutes. The resulting exotherm increased the temperature of the contents to 149° C. The nitrogen purge assembly was re-attached. Then the contents were heated between 140-159° C. for 18 hours and 36 minutes and then cooled to room temperature. Throughout the run, samples were removed at various intervals and the viscosity measured with a Brookfield viscometer and molecular weight was determined by gel permeation chromatography (GPC). Results are summarized in the following Table I:

TABLE I

| Time (minutes) | Viscosity (cps) | Mw | Mn | Mw/Mn | Water solubility |
|---|---|---|---|---|---|
| 0 | | | | | Yes |
| 261 | 12,597 | 5521 | 2459 | 2.2 | Yes |
| 464 | 34,900 | 7370 | 1946 | 3.8 | Yes |
| 479 | 42,216 | 10901 | 3320 | 3.3 | Yes |
| 638 | 77,767 | 14446 | 2349 | 6.0 | Yes |
| 970 | 95,833 | 21013 | 2417 | 8.7 | Yes |

Example 3

Diglycidyl ether of neopentyl glycol (200.0 grams, 216.28 g/mole, 0.9247 moles) and 2-methoxyethyl ether (92.6 grams) were weighed into a 1-liter 4-neck round bottom flask equipped with a thermocouple and heating device, condenser, stirrer and nitrogen purge assembly. The contents were heated to 97° C. and the nitrogen purge assembly was replaced with an addition funnel. Ethanolamine (42.6 grams, 61.08 g/mole, 0.6974 mole) and 2-methoxyethyl ether (56.8 grams) were weighed into a beaker and transferred to the addition funnel. The solution of ethanolamine in 2-methoxyethyl ether was added dropwise to the reactor contents over a period of 64 minutes. The resulting exotherm increased the temperature of the contents to 143° C. The nitrogen purge assembly was re-attached. The contents were heated between 143 and 188° C. for 11 hours and 22 minutes giving a yellow viscosity liquid with a Brookfield viscosity of 111,550 cps. The product was soluble in methanol and isopropanol.

Example 4

The product from Example 3 (5.11 grams) was dissolved in methanol (5.04 grams) and isopropanol (0.65 grams).

Example 5

Diglycidyl ether of neopentyl glycol (216.29 grams, 1.000 mole) and di(propylene glycol) methyl ether (76.80 grams) were weighed into a 1-liter 4-neck round bottom flask equipped with a thermocouple and heating device, condenser, stirrer and nitrogen purge assembly. The contents were heated to 76° C. The nitrogen purge system was replaced with an additional funnel, 3-(Dimethylamino)propylamine (15.34 grams, 102.18 g/mole, 0.1502 mole), ethanolamine (51.92 grams, 0.8500 mole) and di(propylene glycol)methyl ether (65.50 grams) were weighed into a beaker and transferred to the addition funnel. The solution of 3-(dimethylamino)propylamine and ethanolamine in di(propylene glycol)methyl ether was added dropwise over a period of 29 minutes. The resulting exotherm increased the temperature of the contents to 183° C. The reactor contents started to climb the stirring rod. Only 77% of the 3-(dimethylamino)propylamine and ethanol amine in di(propylene glycol) methyl ether solution was reacted before gellation.

Example 6

Diglycidyl ether of neopentyl glycol (200.14 grams, 0.9254 moles) and di(propylene glycol) methyl ether (92.54 grams) were weighed into a 1-liter 4-neck round bottom flask equipped with a thermocouple and heating device, condenser, stirrer and nitrogen purge assembly. The contents were heated to 87° C. The nitrogen purge system was replaced with an additional funnel. 3-(Dimethylamino) propylamine (1.43 grams, 0.01399 moles), ethanolamine (41.83 grams, 0.6848 moles) and di(propylene glycol)methyl ether (56.66 grams) were weighed into a beaker and transferred to the addition funnel. The solution of 3-(dimethylamino)propylamine and ethanolamine in di(propylene glycol)methyl ether was added dropwise over a period of 92 minutes. Reactor contents were a yellow and transparent liquid with a viscosity of 4147 cps. The resulting exotherm increased the temperature of the contents to 158° C. The nitrogen purge assembly was re-attached. The contents were heated between 152° C. and 183° C. for 13 hours and 38 minutes giving an orange transparent and viscous liquid. The reactor contents were cooled to 85° C. and diethanolamine (3.72 grams, 105.14 g/mole, 0.03538 moles) was added. The contents were heated between 85° C. and 146° C. for 35 minutes and then cooled to room temperature to give a solution with a viscosity of 149,200 cps.

Example 7

The product from Example 6 (9.94 grams) was dissolved in methanol (9.50 grams) and isopropanol (1.20 grams).

Example 8

Diglycidyl ether of neopentyl glycol (200.2 grams, 0.9256 moles) and di(propylene glycol) methyl ether (70.11 grams) were weighed into a 1-liter 4-neck round bottom flask equipped with a thermocouple and heating device, condenser, stirrer and nitrogen purge assembly. The contents were heated to 79° C. The nitrogen purge system was replaced with an additional funnel. 3-(Dimethylamino) propylamine (2.87 grams, 0.0281 moles), ethanolamine (41.05 grams, 0.6721 moles) and di(propylene glycol)methyl ether (60.13 grams) were weighed into a beaker and transferred to the addition funnel. The solution of 3-(dimethylamino) propylamine and ethanolamine in di(propylene glycol) methyl ether was added dropwise over a period of 41 minutes. The resulting exotherm quickly brought the temperature to 142° C. The reactor contents were maintained at a temperature less than 142° C. by applying cooling to the reactor when it started to approach that temperature. The nitrogen purge assembly was re-attached. The contents were heated between 145° and 157° C. for 30 hours and 20 minutes. The contents were cooled to about 51° C. and then the diglycidyl ether of neopentyl glycol (10.02 grams, 0.04633 moles) was added. The contents were then heated between 152° C. and 167° C. for 29 hours and 23 minutes giving a viscous liquid with a viscosity of 100,880 cps. The reactor contents were cooled to 54° C. and N,N,N'-trimethyl-1,3-propanediamine (8.15 grams, 116.21 g/mole, 0.07013 moles) was added. The contents were heated between 150° C. and 154° C. for 88 minutes and then cooled to room temperature to give a solution with a viscosity of 121,500 cps.

Example 9

The material from Example 8 (10.11 grams), methanol (9.70 grams) and isopropanol (1.24 grams) were blended together.

Example 10

Material from Example 8 (131.04 grams) and 93% sulfuric acid (9.33 grams) were weighed into a 4-neck 500-milliliter round bottom flask equipped with a thermocouple and heating device, condenser, stirrer and nitrogen purge assembly. Water (99.77 grams) was added. The contents were heated to 80° C. and then cooled to room temperature.

Example 11

The material from Example 10 (13.59 grams), methanol (12.94 grams) and isopropanol (1.58 grams) were blended together.

Example 12

Diglycidyl ether of neopentyl glycol (200.06 grams, 0.9250 moles) and di(propylene glycol) methyl ether (70.05 grams) were weighed into a 4-neck 500 milliliter round bottom flask equipped with a thermocouple and heating device, condenser, stirrer and nitrogen purge assembly. The contents were heated to 47° C. The nitrogen purge system was replaced with an additional funnel. 3-(Dimethylamino) propylamine (3.93 grams, 0.03846 moles), ethanolamine (39.41 grams, 0.6452 moles) and di(propylene glycol)methyl ether (60.12 grams) were weighed into a beaker and transferred to the addition funnel. The solution of 3-(dimethylamino) propylamine and ethanolamine in di(propylene glycol)methyl ether was added dropwise over a period of 23 minutes. A water bath was used to prevent the exotherm from raising the reactor temperature above 120° C. The nitrogen purge assembly was re-attached. The contents were heated between 142 and 183° C. for 38 hours and 43 minutes giving a viscous liquid with a viscosity of 388,000 cps. The reactor contents were cooled to 33° C. and N,N,N'-trimethyl-1,3-propanediamine (6.17 grams, 116.21 g/mole, 0.0703 moles) was added. The contents were heated between 150 and 154° C. for 32 minutes and then cooled to room temperature to give a solution with a viscosity of about 366,667 cps.

Example 13

The material from Example 12 10.10 grams), methanol (9.72 grams) and isopropanol (1.41 grams) were blended together to prepare a solution.

Example 14

1,2,7,8-Diepoxyoctane (58.27 grams, 140.18 g/mole, 0.4157 moles) and di(propylene glycol) methyl ether (40.25 grams) were weighed into a 4-neck 250 milliliter round bottom flask equipped with a thermocouple and heating device, condenser, stirrer and nitrogen purge assembly. The contents were heated to 70° C. The nitrogen purge system was replaced with an additional funnel. 3-(Dimethylamino)propylamine (0.87 grams, 0.008514 moles), ethanolamine (24.65 grams, 0.4035 moles) and di(propylene glycol)methyl ether (17.53 grams) were weighed into a beaker and transferred to the addition funnel. The solution of 3-(dimethylamino)propylamine and ethanolamine in di(propylene glycol)methyl ether was added dropwise over a period of 13 minutes. The exotherm did not occur until after the addition of the amine solution was completed. An ice bath was used to keep the exotherm from rising above 164° C. The reactor contents were cooled to 40° C. and the viscosity determined to be above 2,000,000 cps at 26° C.

Example 15

The material from Example 14 (4.79 grams), methanol (4.90 grams) and isopropanol (0.57 grams) were blended together while heating with a heat gun until the contents dissolved.

Example 16

N,N,N'-trimethylethylenediamine (4.06 grams, 102.18 g/mole, 0.03973 moles) in di(propyleneglycol)methyl ether (20.08 grams) was added to all the material from Example 14 The contents were heated between 130° C. and 151° C. for 14 minutes and then cooled to room temperature.

Example 17

The material from Example 16 (8.02 grams), methanol (7.72 grams) and isopropanol (1.03 grams) were blended together while heating.

Example 18

Diglycidyl ether of neopentyl glycol (200.29 grams, 0.9261 moles) and di(propylene glycol) methyl ether (70.46 grams) were weighed into a 1-liter 4-neck round bottom flask equipped with a thermocouple and heating device, condenser, stirrer and nitrogen purge assembly. The contents were heated to 78° C. The nitrogen purge system was replaced with an additional funnel. 3-(Dimethylamino) propylamine (1.442 grams, 0.01411 moles), ethanolamine (41.89 grams, 0.4100 moles) and di(propylene glycol)methyl ether (60.11 grams) were weighed into a beaker and transferred to the addition funnel. The solution of 3-(dimethylamino)propylamine and ethanolamine in di(propylene glycol)methyl ether was added dropwise over a period of 23 minutes. A resulting exotherm quickly brought the reactor contents temperature to 151° C. A process of cooling the reactor contents and then adding more 3-(dimethylamino)propylamine and ethanolamine in di(propylene glycol) methyl ether was repeated to maintain the temperature of the reactor contents under 163° C. during the 23 minutes. The nitrogen purge assembly was re-attached. The contents were heated between 155° and 196° C. for 88 hours and 21 minutes. The reactor contents were cooled to 87° C. and N,N,N'-trimethyl-1,3-propanediamine (8.13 grams, 0.06996 moles) and di(propyleneglycol)methyl ether (9.1 grams) was added. The contents were heated between 165° and 181° C. for 10 minutes and then cooled to room temperature to give a black colored liquid with a viscosity of 16,500 cps.

Example 19

The material from Example 18 (7.65 grams), methanol (7.31 grams) and isopropanol (0.89 grams) was blended together.

Example 20

Diglycidyl ether of neopentyl glycol (200.29 grams, 0.9261 moles) and 2-(2-aminoethoxy)ethanol (73.42 grams, 105.14 g/mole, 0.6983 moles) were weighed into a 1-liter 4-neck round bottom flask equipped with a thermocouple and heating device, condenser, stirrer and nitrogen purge assembly. The contents were heated to 66° C. Within 3 minutes the reactants exothermed to 238° C. The contents were cooled to 153° C. immediately. The reactor contents were a clear but red brown liquid. The contents were heated between 153° and 196° C. for 2 hours and 29 minutes. They were cooled to room temperature and had a viscosity of 369,000 at 25° C.

Example 21

The material from Example 20 (12.96 grams) was dissolved in isopropanol (1.65 grams) and methanol (12.36 grams) with heat and shaking.

Example 22

Material from Example 20 (256.18 grams) and 2-(methoxyethyl) ether (109.79 grams) were heated to 112° C. in a 1-liter 4-neck round bottom flask equipped with a thermocouple and heating device, condenser, stirrer and nitrogen purge assembly to give a solution of 68.58 wt. % solids. The material dissolved in the 2-(methoxyethyl) ether when the temperature reached 72° C. The reactor contents were cooled to room temperature and the viscosity at 26° C. was 898 cps.

Example 23

The material from Example 22 (9.31 grams), methanol (8.85 grams) and isopropanol (1.09 grams) were blended together.

Example 24

Diglycidyl ether of neopentyl glycol (100.06 grams, 0.4626 moles) and 2-methoxyethyl ether (55.33 grams) were weighed into a 1-liter 4-neck round bottom flask equipped with a thermocouple and heating device, condenser, stirrer and nitrogen purge assembly. The contents were heated to 84° C. The nitrogen purge system was replaced with an additional funnel. 2-(2-Aminoethoxy)ethanol (36.68 grams, 0.3489 moles) and 2-methoxyethyl ether (28.28 grams) were weighed into a beaker and transferred to the addition funnel. The solution of 2-(2-aminoethoxy)ethanol in 2-methoxyethyl ether was added dropwise over a period of 22 minutes. The resulting exotherm quickly brought the reactor contents temperature to 140° C. The nitrogen purge assembly was re-attached. The contents were heated between 142° and 174° C. for 54 hours and 59 minutes. The reactor contents were cooled to 110° C. and N-Methyl-D-glucamine (6.82 grams, 195.22 g/mole, 0.03493 moles) was added. The contents were heated between 142° and 159° C. for 3 hours and 10 minutes. The orange colored liquid had a viscosity of 26,343 cps. The contents were heated between 151° C. and 160° C. for an additional 4 hours and 27 minutes and then cooled to room temperature to give a product with a viscosity of 66,400 cps.

Example 25

The material from Example 24 (8.05 grams) methanol (7.61 grams) and isopropanol (1.16 grams) were blended together.

Example 26

The material from Example 24 was heated in a 1-liter 4-neck round bottom flask equipped with a thermocouple and heating device, condenser, stirrer and nitrogen purge assembly between 155° C. and 160° C. for 4 hours and 45 minutes. The contents were cooled to room temperature. The viscosity was 201,257 cps at 26° C.

Example 27

The material from Example 25 (9.56 grams), methanol (9.04 grams) and isopropanol (1.06 grams) were blended together.

Example 28

Diglycidyl ether of neopentyl glycol (100.07 grams, 0.4627 moles) and heavy aromatic naptha (56.61 grams) were weighed into a 1-liter 4-neck round bottom flask equipped with a thermocouple and heating device, condenser, stirrer and nitrogen purge assembly. The contents were heated to 86° C. The nitrogen purge system was replaced with an additional funnel. Additional, a portion of heavy aromatic naptha (28.06 grams) was added to the reactor contents. 2-(2-Aminoethoxy) ethanol (36.72 grams, 0.3492 moles) was weighed into a beaker and transferred to the addition funnel. 2-(2-Aminoethoxy)ethanol was added dropwise resulting in an exotherm which quickly brought the reactor contents temperature to 182° C. The reactor contents were cooled to 156° C. and then the remaining 2-(2-aminoethoxy)ethanol was added. The total addition time for 2-(2-aminoethoxy)ethanol was 18 minutes. The nitrogen purge assembly was re-attached. The contents were heated between 138° and 179° C. for 53 hours and 20 minutes. The reactor contents were cooled to 105° C. and N-methyl-D-glucamine (6.82 grams, 0.03493 moles) was added. The contents were heated between 142° C. and 186° C. for 2 hours and 43 minutes. The final product had a viscosity of 100,857 cps at 25° C.

Example 29

The mixed material from Example 28 (15.62 grams), methanol (14.89 grams) and isopropanol (1.84 grams) were blended together.

Example 30

Diglycidyl ether of neopentyl glycol (118.61 grams, 0.5484 moles) and 2-methoxyethyl ether (118.61 grams) were weighed into a 1-resin kettle equipped with a thermocouple and heating device, condenser, stirrer and nitrogen purge assembly. The contents were heated to 87° C. and the nitrogen purge assembly was replaced with an addition funnel. Jeffamine XTJ-505 (209.49 grams, 0.3491 moles) and 2-methoxyethyl ether (52.78 grams) were weighed into a beaker and transferred to the addition funnel. Jeffamine XTJ-505 (a monoamine terminated polyethylene/polypropylene glycol of about 600 molecular weight with a propylene oxide/ethylene oxide mole ratio of about 9/1) in 2-methoxyethyl ether was added dropwise to the reactor contents over a period of 90 minutes. The resulting exotherm increased the temperature of the contents to 138° C. The nitrogen purge assembly was re-attached. The contents were heated between 147° C. and 178° C. for an additional 99 hours and 12 minutes giving a liquid with a Brookfield viscosity of 628 cps.

Example 31

The material from Example 30 (6.51 grams), methanol (6.24 grams) and isopropanol (0.79 grams) were blended together.

Example 32

Diglycidyl ether of neopentyl glycol (216.3 grams, 1,000 moles) and di(propylene glycol)methyl ether (128.0 grams) were weighed into a 1-liter resin kettle equipped with a thermocouple and heating device, condenser, stirrer and nitrogen purge assembly. The contents were heated to 83° C. and the nitrogen purge assembly was replaced with an addition funnel. Ethanolamine (61.05 grams, 0.9995 moles) and di(propylene glycol) methyl ether (42.02 grams) were weighed into a beaker and transferred to the addition funnel. The solution of ethanolamine in di(propylene glycol) methyl ether was added dropwise to the reactor contents over a period of 27 minutes. The resulting exotherm increased the temperature of the contents to 156° C. The nitrogen purge assembly was re-attached. The contents were heated between 140° C. and 151° C. for an additional 9 hours and 31 minutes. Diethanolamine (10.55 grams, 105.14 g/mole, 0.1003 moles) was added dropwise over a period of 21 minutes between 145° C. and 149° C. The additional funnel was rinsed with about a gram of di(propylene glycol) methyl ether into the reactor contents. The reactor contents were cooled to room temperature giving a liquid with a Brookfield viscosity of 19,700 cps.

Example 33

62.73 wt. % Diethanolamine capped ethanolamine/diglycidyl ether of neopentyl glycol copolymer in di(propylene glycol) methyl ether (111.05 grams) from Example 8 was dissolved in water (79.12 grams). 54 wt. % Epichlorohydrin terminated polyethylene glycol methyl ether (92.26 grams, 5082 g/mol, 0.009803 moles) in water was added and stirred to give a brown-orange opaque colored liquid with a pH of 7.99. The pH was adjusted to a pH of 8.41 with 3.6-wt. % solution of sodium hydroxide (28.67 grams). The contents were transferred to a 4-neck 500 mL round bottom flask equipped with a thermocouple and heating device, condenser, stirrer and nitrogen purge assembly. The reactor contents were heated between 79° C. and 93° C. for 45 hours and 4 minutes. The viscosity was measured to be 337 cps and the pH was 7.59. The pH was adjusted to a pH of 8.39 with 3.6 wt. % solution of sodium hydroxide (22.76 grams). The contents were heated between 79° C. and 93° C. for another 21 hours and 18 minutes. Throughout the run, samples were removed at various intervals and the viscosity measured with a Brookfield viscometer. The results are shown in Table II:

TABLE II

| Time (min.) | Viscosity (cps) | Comments |
|---|---|---|
| 154 | 92.5 | |
| 1243 | 189 | |
| 1643 | 202 | |
| 2704 | 337 | |
| 3036 | 236 | Diluted with 22.76 grams of 3.6 wt. % NaOH |
| 3982 | 459 | |

Example 34

The material from Example 33 (7.83 grams), methanol (7.52 grams) and isopropanol (0.96 grams) was blended together.

Example 35

62.35 wt % Diethanolamine (DEA) capped 3-(dimethylamino) propylamine (DMAPA)/ethanolamine (EA)/diglycidyl ether of neopentyl glycol (DGE NPG) terpolymer in di(propylene glycol) methyl ether (111.38 grams) from Example 6, 54 wt. % epichlorohydrin terminated polyethyleneglycol methyl ether (91.86 grams, 5082 g/mole, 0.009761 moles) in water, and water (78.96 grams) were added to a beaker and stirred to give a yellow brown colored liquid with a pH of 7.63. The pH was adjusted to a pH of 8.45 with 3.6 wt. % solution of sodium hydroxide (12.49 grams). The viscosity of the contents was 107 cps. The contents were transferred to a 4-neck 500 mL round bottom flask equipped with a thermocouple and heating device, condenser, stirrer and nitrogen purge assembly. The reactor contents were heated between 80° and 91° C. for 4 hours and 20 minutes. The viscosity was measured to be 285 cps and the pH was 7.62. The pH was adjusted to a pH of 8.43 with 3.6 wt. % solution of sodium hydroxide (12.68 grams). The viscosity was 245 cps. The contents were heated between 85° and 94° C. for 39 hours and 12 minutes. Throughout the run, samples were removed at various intervals and the viscosity measured with a Brookfield viscometer. The results are shown in the following Table III. The grafted polyhydroxyetheramine was a yellow brown opaque wax with a final viscosity of 8845 cps.

TABLE III

| Time (min.) | Viscosity (cps) | Comments |
| --- | --- | --- |
| 0 | 107 | 2 Phases |
| 260 | 285 | 2 Phases |
| 637 | 339 | 2 Phases |
| 959 | 597 | 2 Phases |
| 1361 | 1044 | Aggregate |
| 1718 | 1610 | Aggregate |
| 2082 | 2260 | Aggregate |
| 2512 | 3665 | |
| 2981 | 8202 | Polymer climbs stirring rod at 19° C. and spindle in viscosity measurement. |

Mw, Mn and polydispersity were determined to be 12658, 2537 and 5.0, respectively, by gel permeation chromatography. The columns used in the GPC were TSK Gel G6000PW, G4000PW and G2000 PW (manufactured by Toya Soda Corporation, Montgomeryville, Pa. 18936). The eluent was 1:1 methanol to water with 1 wt % acetic acid and 0.1N sodium nitrate. The flow rate and temperature were 0.8 ml/minute and 35° C., respectively.

Example 36

The product from Example 35 (7.07 grams) was dissolved in methanol (6.79 grams) and isopropanol (0.84 grams).

Example 37

The material from Example 35 (10.04 grams), isopropanol (1.16 grams) and methanol (9.57 grams) were blended together.

Example 38

The material from Example 35 (5.05 grams), isopropanol (0.0872 grams), a wetting agent consisting of a blend of oxyalkylated alcohols and phosphate esters (1.058 grams) and methanol (3.825 grams) were blended together.

Example 39

Linear dodecylbenzenesulfonic acid (0.27 grams) was added and blended with the material of Example 38.

Example 40

66.82 wt. % N,N,N'-Trimethyl-1,3-propanediamine (TMPDA) capped 3-(dimethylamino)propylamine (DMAPA)/ethanolamine (EA)/diglycidyl ether of neopentyl glycol (DGE NPG) terpolymer in di(propylene glycol) methyl ether (131.04 grams) from Example 8, water (99.77 grams) and 93% sulfuric acid (9.33 grams) were added to a 4-neck 500 milliliter round bottom flask equipped with a thermocouple and heating device, condenser, stirrer and nitrogen purge assembly and heated to 80° C. while stirring. The contents (198.36 grams) were cooled to room temperature and poured into a beaker. 54 wt % Epichlorohydrin terminated polyethyleneglycol methyl ether (91.8 grams, 5082 g/mole, 0.009754 moles) in water was added. The pH of this mixture was 5.89. The pH was adjusted to a pH of 8.38 with 3.6 wt. % solution of sodium hydroxide (148.87 grams) while stirring. During the pH adjustment the original dark brown liquid became two separate phases with the solid phase on the bottom. The contents were then heated with stirring between 70° and 90° C. for 94 minutes. The 2 phases intermixed. The polymer begin to wrap around the stirring rod so a kill solution of 93% sulfuric acid (2.33 grams) and sodium chloride (4.00 grams) in water (40.06 grams) was added at 90° C. The contents were heated between 88 and 90° C. for an additional 35 minutes and then cooled to room temperature. The pH of the material was 6.34. The contents were transferred to a beaker and additional 93 wt. % sulfuric acid was added dropwise with stirring until a pH of 2.51 was obtained. The contents were further digested by transferring them back to a 4-neck 500 milliliter round bottom flask equipped with a thermocouple and heating device, condenser, stirrer and nitrogen purge assembly and heating between 77 and 86° C. for 8 hours and 21 minutes. Final pH was 3.53. Final viscosity at 25° C. was 220 cps.

Example 41

The material from Example 40 (12.63 grams) was diluted in water (37.85 grams).

Example 42

Poly(ethylene glycol) diglycidyl ether (280.54 grams, 0.5333 mole) was weighed into a 500 milliliter 4-neck round bottom flask equipped with a thermocouple and heating device, condenser, stirrer and nitrogen purge assembly. The poly(ethylene glycol) diglycidyl ether was heated to 89° C. A blend of 3-(dimethylamino)propylamine (0.9951 grams, 0.0097 moles) and ethanolamine (28.37 grams, 0.4645 moles) was added dropwise. The resulting exotherm quickly brought the temperature to 187° C. The solution was cooled down to about 138° C. with an ice bath. The reactor contents were maintained at a temperature between 150° and 157° C. for 3 hours and 39 minutes and then cooled to room temperature. The Brookfield viscosity was 130,000 cps at 25° C. Di(propylene glycol) methyl ether (189.82 grams) was added to the contents to give a 943 cps liquid. The reactor contents were then heated between 152° and 170° C. for 60 hours and 40 minutes giving a viscous liquid with a viscosity of 2606 cps.

Ethanolamine (3.72 grams, 0.0609 moles) in di(propylene glycol) methyl ether (3.15 grams) was added to the reactor contents. The reactor contents were heated between 153° to 173° C. for 7 hours and 15 minutes, at which point the vortex created by the stirrer disappeared. Diethanolamine (2.43 grams, 0.0231 moles) in di(propylene glycol) methyl ether (4.89 grams) was added to the contents. The reactor contents were immediately cooled to room temperature to give a solution with a Brookfield viscosity of 182,000 cps at 25° C.

Example 43

61.5 wt. % Diethanolamine (DEA) capped 3-(dimethylamino)propylamine (DMAPA)/ethanolamine (EA)/poly(ethylene glycol) diglycidyl ether terpolymer in di(propylene glycol) methyl ether (111.86 grams) from Example 42, water (278.76 grams) and 67.12 wt. % epichlorohydrin terminated polyethyleneglycol methyl ether (91.8 grams, 5082 g/mole, 0.01212 moles) in water were added to a 600 ml beaker with a stirring bar. pH was measured to be 7.26. The pH was readjusted to 8.50 by the addition of 23.95 grams of an aqueous 3.6 wt. % caustic solution. The Brookfield viscosity was 186 cps at 25° C. The contents were transferred to a 4-neck 500-milliliter round bottom flask equipped with a thermocouple and heating device, condenser, stirrer and nitrogen purge assembly and heated between 87° to 91° C. for 118 minutes. The contents were cooled to room temperature. The viscosity was 336.8 cps. pH was 7.0. The pH was re-adjusted to 8.71 with 15.80 grams of an aqueous solution of 3.6 wt. % caustic. The reactor contents were heated between 88° and 92° C. for 2 hours and 55 minutes. The contents were cooled to room temperature and the viscosity was determined to be 1140 cps. The reactor contents (9.41 grams) was dissolved in isopropanol (1.09 grams) and methanol (8.97 grams).

Example 44

50 wt. % Ethylene glycol diglycidyl ether (196.08 grams, 0.5628 moles) was weighed into a 500 milliliter 4-neck round bottom flask equipped with a thermocouple and heating device, condenser, stirrer and nitrogen purge assembly. The (ethylene glycol) diglycidyl ether was heated to 78° C. A blend of 3-(dimethylamino) propylamine (0.7242 grams, 0.0071 moles) and ethanolamine (19.98 grams, 0.3271 moles) was added dropwise in two minutes. The resulting exotherm quickly brought the temperature to 180° C. The solution was cooled immediately with an ice bath. Di(propylene glycol) methyl ether (132.07 grams) was added in a seven minute period. Reactor temperature was 93° C. The reactor contents were heated and maintained at a temperature between 149° C. and 155° C. for 46 minutes. Diethanolamine (1.48 grams, 0.01408 moles) in di(propylene glycol) methyl ether (11.05 grams) was added to the contents, followed by the addition of di(propylene glycol) methyl ether (10.0 grams). The reactor contents were heated between 152° C. to 153° C. for 10 minutes and then cooled to room temperature. The Brookfield viscosity was 87 cps at 25° C.

The reactor contents were heated between 151° and 171° C. for 7 hours and 28 minutes and then cooled to room temperature. The Brookfield viscosity was 1695 cps.

Example 45

58.77 wt. % Diethanolamine (DEA) capped 3-(dimethylamino)propylamine (DMAPA)/ethanolamine (EA)/ethylene glycol diglycidyl ether terpolymer in di(propylene glycol) methyl ether (111.58 grams) from Example 44, water (79.36 grams) and 67.12 Wt. % epichlorohydrin terminated polyethyleneglycol methyl ether (91.84 grams, 5082 g/mole, 0.01212 moles) in water were added to a 600 ml beaker with a stirring bar. pH was measured to be 8.42. The Brookfield viscosity was 157 cps at 25° C. The contents were transferred to a 4-neck 500-milliliter round bottom flask equipped with a thermocouple and heating device, condenser, stirrer and nitrogen purge assembly and heated between 91° to 93° C. for 65 minutes. The Brookfield viscosity was 749 cps. The reactor contents (8.61 grams) were dissolved in isopropanol (1.12 grams) and methanol (7.87 grams).

The demulsifiers ("NEA") were evaluated in crude oil from the Energy Strawberry Formation in West Texas. The crude was collected on Mar. 24, 2000. An acid corrosion inhibitor (ACI) was formulated using a benzyl chloride quaternary compound. A comparative nonionic, alkylated, phenolic-type demulsifier, EC-9547, is also exemplified in the Tables. The results from the demulsifier evaluation are summarized in the following Table IV.

TABLE IV

| NEA | ACI/NEA VOL % | Time (min.) | | | | | | Comments |
|---|---|---|---|---|---|---|---|---|
| | | 1 | 2 | 4 | 6 | 8 | 10 | |
| Blank | 3/0 | Trace | 3 | 40 | 76 | 86 | 90 | |
| EC-9547 | 3/1 | Trace | 4 | 20 | 64 | 88 | 96 | Clear |
| Ex. 4 | 3/1 | 14 | 54 | 84 | 100 | | | No emulsion. Spots on glass in acid phase. Interface is free flowing. |
| Ex. 7 | 3/1 | 14 | 36 | 80 | 100 | | | No emulsion. Spots on glass. Interface good and free flowing. |
| Ex. 11 | 3/1 | 11 | 26 | 64 | 90 | 100 in 7:55 min. | | Interface ragged. |
| Ex. 13 | 3/1 | 9 | 22 | 74 (5E) | 96 (5E) | | | Interface ragged, bad emulsion at interface. |
| Ex. 15 | 3/1 | 10 | 28 | 76 | 98 | | | Acid phase not clean, spots on glass. Small amount of emulsion on top of oil phase, good moveable interface. |
| Ex. 17 | 3/1 | 10 | 30 | 74 | 92 | 98 | 100 in 9:50 min. | Acid phase not clean, spots on glass. Small amount of emulsion on top of oil phase, good moveable interface. |
| Ex. 19 | 3/1 | 11 | 30 | 76 | 94 | 100 in 7:32 min. | | Acid phase not clean, spots on glass, no rag at interface, good movable interface. |
| Ex. 21 | 3/1 | 10 | 30 | 70 | 90 | 100 | | Acid not clean. Ragged interface. |
| Ex. 23 | 3/1 | 14 | 36 | 80 | 96 | | | Good. Some spots on glass. Ragged interface. |
| Ex. 25 | 3/1 | 12 | 28 | 72 | 92 | 100 in 7:24 min. | | Acid not clean. |
| Ex. 27 | 3/1 | 14 | 38 | 88 | | | | Acid not clean, 20 ml emulsion at interface. |
| Ex. 29 | 3/1 | 12 | 34 | 76 | 92 | | | Acid not clean, emulsion at interface. |
| Ex. 31 | 3/1 | 16 | 40 | 82 | 96 | | | Acid not clean, emulsion at interface. |

TABLE IV-continued

| NEA | ACI/NEA VOL % | Time (min.) | | | | | Comments |
| --- | --- | --- | --- | --- | --- | --- | --- |
| | | 1 | 2 | 4 | 6 | 8 | 10 | |
| Ex. 34 | 3/1 | 8 | 20 | 54 | 82 | 96 | 100 in 9:40 min. | |
| Ex. 36 | 3/1 | 4 | 40 | 80 | 94 | Clean | | Clear. Very few spots. |

The demulsifiers were evaluated in TROIKA TA 1, 2 & 3 Crude Oil from Shell Petroleum's "Bullwinkle" Platform in the Gulf of Mexico. The crude was collected on Mar. 30, 1999. An acid corrosion inhibitor (ACI) was formulated containing a benzyl chloride quaternary compound. The results from the demulsifier evaluation are summarized in the following Table V:

TABLE V

| NEA | ACI/NEA VOL % | Time (min.) | | | | | Comments |
| --- | --- | --- | --- | --- | --- | --- | --- |
| | | 1 | 2 | 4 | 6 | 8 | 10 | |
| EC-9547 | 3/1 | 10 | 18 | 44 | 66 | 80 | 98 | 100 in 10:52 minutes. Very good. |
| Ex. 23 | 3/1 | 10 | 18 | 48 | 88 | | | 100 in 12:00 minutes. Spots in acid phase. "OK" interface |
| Ex. 34 | 3/1 | 8 | 18 | 48 | 72 | 88 | 94 | 100 in 15 minutes. |

The demulsifiers were evaluated in Miniham OPG from Andrews Co. 8000', Fasselman in Midland, Tex. The crude was collected on November 2000. The acid corrosion inhibitor (ACI) was a formulation containing a benzyl chloride quaternary compound. The results from the demulsifier evaluation are summarized in Table VI.

TABLE VI

| NEA | ACI/NEA Vol. % | Time (min.) | | | | | | Comments |
| --- | --- | --- | --- | --- | --- | --- | --- | --- |
| | | 1 | 2 | 4 | 6 | 8 | 10 | |
| Ex. 9 | 3/1 | 10 | | 82 | 100 in 5:27 min. | | | Nothing on oil phase surface, interface smooth |
| Ex. 34 | 3/1 | 12 | 48 | 92 (10E) | 92 (6E) | | | Ragged interface, emulsion at the interface, Glass is spotted, oil top really clean. |
| Ex. 34 | 3/2 | trace | 2 | 10 (30E) | 20 (40E) | 50 (E) | 60 (40E) | 70 in 2 minutes |
| Ex. 37 | 3/1 | 5 | 20 | 52 | 76 | 88 | 96 (4E) | Finished in 10 minutes. Slightly ragged interface. Acid phase pretty dirty. Spots on glass. |
| Ex. 38 | 3/1 | 10 | 30 | 70 | 90 | 100 | | Spot on glass lot less, ragged interface, emulsion in oil phase |
| Ex. 39 | 3/1 | 10 | 39 | 72 | 90 | | | Cleaner, less spots on glass wall |

The specific Examples herein are to be considered as being primarily illustrative. Various changes beyond those described will no doubt occur to those skilled in the art and such changes are to be understood as forming an inclusive part of this invention insofar as they fall within the spirit and scope of the appended claims.

The invention claimed is:

1. A demulsifier composition comprising oligo- and polymeric compounds, wherein the oligo- and polymeric compounds are prepared by
   1) reaction of a) an amine having only two reactive amino hydrogens, b) an aliphatic or cycloaliphatic epoxidized olefin having two epoxide groups, and c) a second amine monomer having only two reactive amino hydrogens and a tertiary amine group;
   2) optional subsequent reaction of epoxy groups of the oligo- and polymeric reaction products with d) an amine capping monomer having one or two reactive amino hydrogens; and
   3) subsequent reaction of amine groups of the oligo- and polymeric reaction products with an N-alkylating agent selected from epichlorohydrin or epibromohydrin reacted polyalkoxide compounds which comprise an oxyalkylene group selected from polyethoxy groups and polypropoxy groups in a propoxy to ethoxy ratio of from about 9 to 1 to about 1 to 9 and methoxy-capped polyethylene oxide.

2. A demulsifier composition comprising the oligo- and polymeric reaction products of at least one first amine having only two reactive hydrogens, selected from the group consisting of methylamine, ethylamine, propylamine, butylamine, sec-butylamine, isobutylamine, 3,3-dimethylbutylamine, hexylamine and benzylamine, 2-amino-1-butanol, 4-amino-1-butanol, 2-amino-2-methyl-1-propanol, 6-amino-1-hexanol, ethanolamine, propanolamine, tris(hydroxymethyl)aminomethane, D-glucamine, 3-amino-1,2-propanediol, 2-amino-2-methyl-1,3-propanediol, 2-amino-2-ethyl-1,3-propanediol, 3-(diemthylamino)propylamine, N,N-dimethylethylenediamine, N,N-diethylethylenediamine, 1-(2-aminoethyl)piperidine, 4-(2-aminoethyl)morpholine, 2-(2- aminoethyl)-1-methylpyrrolidine, 1-(2-aminoethyl) pyrrolidine, 2-(2-aminoethyl)pyridine, 2-(2-aminoethylamino)ethanol, piperazine, 2-methyl piperazine, 2,6-dimethylpiperazine, 2-(methylamido)piperazine, N,N'-bis(2-hydroxyethyl)ethylenediamine, N,N'-dimethylethylenediamine, N,N-dimethyl-1,4-phenylenediamine and N,N'-dimethyl-1,6-hexanediamine;

(b) at least one second amine having only two reactive amino hydrogens and a tertiary amine group selected from the group consisting of 3-(dimethylamino)propylamine, N,N-dimethylethylenediamine, N,N-diethylethylenediamine, 1-(2-aminoethyl)piperidine, 4-(2-aminoethyl)morpholine, 2-(2-aminoethyl)-1-methylpyrrolidine, 1-(2-aminoethyl)pyrrolidine, and 2-(2-aminoethyl)pyridine;

(c) at least one diepoxy-containing compound said diepoxy compound selected from the group consisting of: bis(2, 3-epoxypropyl)ether, diglycidyl ether of 1,4-butanediol, diglycidyl other of neopentyl glycol, diglycidyl ether of ethylene glycol, glycerol diglycidyl ether, diglycidyl ether of polyethyleneglycol, diglycidyl ether of polypropylene glycol, the diglycidyl ether from the reaction product of ethylene oxide with propylene oxide, diglycidyl ester of cyclohexane dimethanol and diglycidyl ester of a dimer acid, 1,2,3,4-diepoxybutane; 1,2,7,8-diepoxyoctane, 1,2,9,10-diepoxydecane and 1,2,5,6-diepoxycyclooctane;

(d) at least one amine capping monomer having one or two reactive amine hydrogens, wherein said capping monomer is reacted with terminal epoxy groups on said oligo- and polymeric reaction products, the amine capping monomer being selected from the group consisting of diethanolamine, diisopropanolamine, N-methyl-D-glucamine, N-methylpropylamine, dimethylamine, diethylamine, dipropylamine, diisopropylamine, N,N,N'-trimethyl-1,3-propanediamine, N,N,N'-trimethylethylenediamine, N,N-dimethyl-N'-ethylethylenediamine, N,N,N'-triethylethylenediamine; and (e) at least one N-alkylating epichlorohydrin capped polyalkylene glycol methyl ether having the following formula:
R8-O—[CH$_2$—CH(R9)—O]$_n$—CH$_2$—CH(OH)—CH$_2$—X where:
R8 is hydrogen, C$_1$ to C$_6$ alkyl, C$_6$-C$_{10}$ aryl, 2-hydroxy-3-chloropropyl, or 2,3-oxopropyl,
R9 is hydrogen, or C$_1$ to C$_6$ alkyl,
X is a halogen atom, and n in the range of 1 to 120.

3. The demulsifier composition according to claim 2, further comprising the oligo- and polymeric reaction product of an amine having only two reactive amino hydrogens selected from the group consisting of; 2-(2-aminoethoxy) ethanol; CH$_3$OCH$_2$CH$_2$O[CH(—CH$_3$)CH$_2$O]$_n$ CH$_2$CH(—NH$_2$)CH$_3$ where n is at least one; CH$_3$—O—(CH$_2$CHR—O)$_n$—CH$_2$CH(—CH$_3$)NH$_2$ where R is H or CH$_3$ and n is at least one; and H$_2$N—CH$_2$CH$_2$OCH$_2$CH$_2$—OH, a diepoxy-containing compound, and a triepoxy-containing compound.

4. A demulsifier composition comprising oligo- and polymeric reaction products of
(a) a first amine having only two reactive amino hydrogens selected from the group consisting of: ethanolamine, propanolamine, and polyoxyalkylamines according to the formula

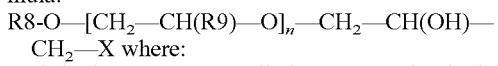

where R4 is —OCH$_3$, R5 is hydrogen or —CH$_3$, and n is 1 to 45, 2-(2-aminoethylamino)ethanol, piperazine, N,N-bis(2-hydroxyethyl)ethylenediamine, and N,N'-dimethylethylenediamine and mixtures thereof;

(b) a diepoxy compound selected from the group consisting of diglycidyl ether of 1,4-butanediol, diglycidyl ether of neopentyl glycol, diglycidyl ether of ethylene glycol, diglycidyl ether of polyethyleneglycols, 1,2,3,4-diepoxybutane, 1,2,7,8-diepoxyoctane and mixtures thereof;

(c) an amine capping monomer having one or two reactive amino hydrogens subsequently reacted with terminal epoxy groups, selected from the group consisting of diethanolamine, N-methyl-D-glucamine, N-methylpropylamine, N,N,N'-trimethyl-1,3-propanediamine, N,N,N'-trimethylethylenediamine, and mixtures thereof, and;

(d) an N-alkylating epichlorohydrin capped polyalkylene glycol methyl ether-containing group having the formula:

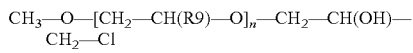

where n is 100 to 113 and is R9 is selected from the group consisting of hydrogen and a C$_1$ to C$_6$ alkyl group.

5. The demulsifier composition according to claim 4, wherein (a) further comprises a second amine monomer having only two reactive amino hydrogens and a tertiary amine group selected from the group consisting of 3-(dimethylamino)propylamine, N,N-dimethylethylenediamine, and mixtures thereof.

6. The demulsifier composition according to claim 4, further comprising at least one C$_1$ to C$_{16}$ alcohol and at least one acid-containing compound.

7. The demulsifier composition according to claim 6 further comprising a compound selected from the group consisting of alkyleneoxide copolymers, oxyalkylated alcohols, organo-phosphate esters, inorganic phosphate esters, polyglycols, resole resins, novalac resins and mixtures thereof.

8. The demulsifier composition according to claim 6 further comprising, an acid selected from the group consisting of arylalkylsulfonic acid; aqueous hydrochloric acid, hydrofluoric, sulfamic, acetic acid, formic acid, nitric acid, citric acid, ethylenediaminetetraacetic acid, nitriloacetic acid and mixtures thereof.

9. A method of treating an oil bearing formation comprising the steps of: charging an oil bearing formation with a demulsifying amount of the demulsifier composition according to claim 6 blended per 1000 gallons of an aqueous organic or aqueous inorganic acid solution.

10. The method of treating an oil bearing formation according to claim 9 wherein the effective amount of demulsifier composition is in the range of 0.01 to about 5 gallons per 1000 gallons of an added aqueous acidic solution.

11. A method of preparing a polymeric demulsifier compound comprising the steps of:
a) reacting 0.5 to 1.4 moles of amines having only two reactive amino hydrogens with 1.0 mole of a diglycidyl ether of a glycol or epoxidized olefin and heating the reactants to between 25° C. to 240° C. for a period of time sufficient for the reaction product to attain a viscosity of at least 80,000 cps; and subsequently
b) capping unreacted glycidyl or epoxy groups on the polymeric reaction product with an amine monomer having only two reactive amino hydrogens and a tertiary amine group; and
c) alkylating amine groups on the polymeric reaction product with a N-alkylating agent-containing group to provide a polymeric demulsifier compound.

12. The method of claim 11 further comprising the step of adding a second amine monomer having only two reactive amino hydrogens and a tertiary amine group to the reaction.

13. The method of claim 11, further characterized by reacting 0.7 to 1.2 moles of at least one amine having only two active amino hydrogens, and a second amine monomer having only two reactive amino hydrogens and a tertiary amine group with one mole of diglycidyl ether of a glycol or epoxidized olefin between 25° C. to 240° C. for a time period sufficient for the reaction product to reach a viscosity of at least 80,000 cps.

14. The method of claim 11 further characterized by grafting an N-alkylating agent onto the polymer by reacting the polymer and N-alkylating agent a weight ratio of between 1:1 to 8:1 at a pH between 7.5 and 9.0 at a temperature between 60° C. and 95° C. for a time period sufficient to reach a solution viscosity between 200 and 9000 cps.

15. The method of claim 11 further characterized by grafting the N-alkylating agent onto the polymer at a weight ratio of between 1:1 to 8:1 of polymer to N-alkylating agent, at a pH between 7.5 and 9.0 and at a temperature between 85° C. and 95° C. for a time sufficient to produce a viscosity between 200 and 5000 cps.

16. The method of claim 11 wherein the N-alkylating agent is epichlorohydrin capped polyalkylene glycol methyl ether.

17. The method of claim 11 further comprising the step of protonating the polymeric reaction product after steps a) and b) with an acid.

18. A demulsifier composition comprising the polymeric reaction product of
1) 0.8:1 to about 1.3:1 molar equivalents relative to diepoxy-containing compound of at least one first amine-containing group having only two reactive amino hydrogens selected from the group consisting of
(a) methylamine, ethylamine, propylamine, butylamine, sec-butylamine, isobutylamine, 3,3-dimethylbutylamine, hexylamine, benzylamine, 2-amino-1-butanol, 4-amino-1-butanol, 2-amino-2-methyl-1-propanol, 6-amino-1-hexanol, ethanolamine, propanolamine, tris(hydroxymethyl)aminomethane, 1-amino-1-deoxy-D-sorbitol (D-glucamine), 3-amino-1,2-propanediol, 2-amino-2-methyl-1,3-propanediol, 2-amino-2-ethyl-1,3-propanediol, 3-(dimethylamino)propylamine, N,N-dimethylethylenediamine, N,N-diethylethylenediamine, 1-(2-aminoethyl)piperidine, 4-(2-aminoethyl)morpholine, 2-(2-aminoethyl)-1-methylpyrrolidine, 1-(2-aminoethyl)pyrrolidine, 2-(2-aminoethyl)pyridine, 2-(2-aminoethylamino)ethanol, piperazine, 2-methyl piperazine, 2,6-dimethylpiperazine and 2-(methylamido)piperazine, N,N'-bis(2-hydroxyethyl)ethylenediamine, N,N'-dimethylethylenediamine, N,N'-dimethyl-1,4-phenylenediamine and N,N'dimethyl-1,6-hexanediamine;
(b) amines of formula $NH_2$-R1-$Z_1$; and
(c) amines of formula HN (R1Z1)—R3—NH—(R1Z1); wherein R1 is $(-CH_2-CH_2-O-)_n$, $-(CH_2-CH(-CH_3)-O-)_n$, or $-(CH_2-CH_2-O-)_m-(CH_2CH(-CH_3)-O-)_p-$ where n, m and p are 1 to 45; R3 is a $C_2$-$C_{20}$ alkylene or $C_2$-$C_{20}$ substituted alkylene wherein the substituent are selected from the group consisting of alkylamido, hydroxy, alkoxy, halo, cyano, aryloxy, alkylcarbonyl, arylcarbonyl, and mixtures thereof; and Z1 is hydrogen, alkyl or acyl;
2) at least one diepoxy-containing compound selected from compounds of formula:

Epoxy-$CH_2$—O—(R6—O—)$_n$—Epoxy; and Epoxy-$CH_2$—R7—$CH_2$-Epoxy wherein R6 is selected from $C_2$ to $C_{20}$ alkylene; alkyl substituted $C_2$ to $C_{20}$ alkylene, $C_2$ to $C_{40}$ alkoxy, and $C_2$ to $C_{40}$ hydroxy substituted alkoxy; n is 0 to 20; and R7 is a $C_2$ to $C_{20}$ alkylene, or a substituted alkylene; and
3) subsequently reacting the polymeric reaction product of 1) and 2) with at least one N-alkylating agent selected from the group consisting of epihalohydrin capped polyalkylene glycol methyl ether of formula R8-O—[$CH_2$—CH(R9)—O—]$_n$—$CH_2$—CH(OH)—$CH_2$—X wherein R8 is selected from hydrogen, $C_1$-$C_6$ alkyl, $C_6$-$C_{10}$ aryl, 2-hydroxy-3-chloropropyl and 2,3-oxopropyl; R9 is selected from hydrogen and $C_1$ to $C_6$ alkyl; n is 1 to 120; and X is a halogen atom.

* * * * *